United States Patent [19]
Chang et al.

[11] Patent Number: 6,097,869
[45] Date of Patent: Aug. 1, 2000

[54] MULTIPLE PORT REFLECTION BASED CIRCULATOR

[75] Inventors: Kok Wai Chang, Sunnyvale; Yong Huang, San Jose, both of Calif.

[73] Assignee: E-Tek Dynamics, Inc., San Jose, Calif.

[21] Appl. No.: 09/343,569

[22] Filed: Jun. 30, 1999

Related U.S. Application Data

[63] Continuation-in-part of application No. 09/275,354, Mar. 23, 1999.

[51] Int. Cl.$^7$ ........................................... G02B 6/02
[52] U.S. Cl. ............................ 385/126; 385/47; 385/11
[58] Field of Search ............................ 385/47, 24, 14, 385/35, 15, 43, 18, 31, 11, 33, 126, 122–125; 359/281, 282, 485, 494, 495

[56] References Cited

U.S. PATENT DOCUMENTS

| | | | |
|---|---|---|---|
| 4,178,073 | 12/1979 | Uchida et al. | 350/151 |
| 4,653,852 | 3/1987 | Suzuki et al. | 350/96.33 |
| 4,974,944 | 12/1990 | Chang | 350/377 |
| 5,268,979 | 12/1993 | Weidman | 385/42 |
| 5,355,426 | 10/1994 | Daniel et al. | 385/39 |
| 5,381,503 | 1/1995 | Kanamori et al. | 385/123 |
| 5,446,578 | 8/1995 | Chang et al. | 359/282 |
| 5,471,340 | 11/1995 | Cheng et al. | 359/281 |
| 5,574,596 | 11/1996 | Cheng | 359/484 |
| 5,594,821 | 1/1997 | Cheng | 385/24 |
| 5,644,666 | 7/1997 | Campbell et al. | 385/43 |
| 5,734,763 | 3/1998 | Chang | 385/11 |
| 5,742,722 | 4/1998 | Imoto | 385/126 |
| 5,768,005 | 6/1998 | Cheng et al. | 359/281 |
| 5,825,950 | 10/1998 | Cheng | 385/27 |
| 5,848,208 | 12/1998 | Suzuki et al. | 385/43 |
| 5,930,418 | 7/1999 | Chang | 385/24 |
| 5,930,422 | 7/1999 | Cheng | 385/47 |

*Primary Examiner*—Phan T. H. Palmer
*Attorney, Agent, or Firm*—Blakely, Sokoloff, Taylor & Zafman LLP

[57] ABSTRACT

A multiple port reflection based circulator using a thermally expanded multiple core fiber. The circulator includes optical components to separate, rotate, and combine orthogonally polarized components of light in order to propagate light in one direction among consecutive cores of the fiber. The first and last cores of the fiber also being consecutive cores. The thermally expanded multiple core fiber enabling coupling to the circulator without the use of lenses.

15 Claims, 17 Drawing Sheets

MULTIPLE PORT REFLECTION BASED CIRCULATOR

REFERENCE TO RELATED APPLICATION

This is a continuation-in-part of application Ser. No. 09/275,354, filed Mar. 23, 1999.

FIELD OF THE INVENTION

This invention relates to the field of fiber optics and, more specifically, to fiber optical components.

BACKGROUND

Optical circulators are used in fiber optic networks to switch signals between different optical fiber cores. An optical circulator is a non-reciprocal device that circulates the propagation of light in one direction among multiple input/output optical ports, with any two consecutive optical ports operating as optical isolators. For example, light from a first optical port is propagated to a second optical port, while light propagation in a reverse direction from the second optical port back to the first optical port is inhibited. Light from the second optical port is propagated to the next port in the series. As such, the second optical port operates as both an input port (receiving light from the first optical port) and an output port (transmitting light to the next optical port).

A reflective optical circulator is a particular type of circulator that uses a mirror opposite the light port end of the circulator to reflect light between optical ports, thereby reducing the number of optical components and, thus, the size of the optical circulator. Between the mirror and the optical ports are optical components to separate, rotate, and combine orthogonally polarized light beams in order to couple light among selected pairs of optical fibers attached to the circulator's optical ports. The optical fibers used in these networks typically consist of a core surrounded by a cladding, and one or more layers of protective coatings. Core diameters are typically in the range of 5 to 10 $\mu$m with an outside fiber diameter of 125 $\mu$m.

One disadvantage with some prior art circulators is that they do not circulate light from the last optical port to other optical ports in the series. As such, the last optical port is limited to use as only an output port, thereby limiting the capacity of the circulator.

Another disadvantage with some prior art optical circulators is that the large size of the optical fibers typically coupled to these circulators necessitates the use of larger optical components to circulate light among the optical ports. In addition, the use of these large optical fibers may require the use of lenses within the optical ports to focus light from the optical fiber cores onto the circulator. These lenses also add to the size of the optical circulator. A large optical circulator, due to the use of larger or additional components, may not be desirable.

SUMMARY OF THE INVENTION

The present invention pertains to a method and apparatus for coupling light among a plurality of cores. The apparatus includes a thermally expanded multiple core fiber having the plurality of cores and a circulator coupled to the thermally expanded multiple core fiber. The circulator propagates light in one direction among consecutive cores of the plurality of cores and isolates light between consecutive cores.

Additional features and advantages of the present invention will be apparent from the accompanying drawings and from the detailed description that follows.

BRIEF DESCRIPTION OF THE DRAWINGS

The present invention is illustrated by way of example, and not by way of limitation, in the figures of the accompanying and in which.

DETAILED DESCRIPTION

In the following description, numerous specific details are set forth such as examples of specific materials, process steps, process parameters, dimensions, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

A method and apparatus for circulating optical signals is described. In one embodiment, the optical circulator may be coupled to a thermally expanded multiple core (TEMC) fiber. The optical circulator propagates light among consecutive fiber cores based on the configuration of the optical components within the optical circulator, while isolating light between any two consecutive cores. In one embodiment, consecutive cores of the optical circulator include the last and the first cores in the series of cores of the TEMC fiber.

In one of the embodiments described below, a fusion process is used to manufacture the TEMC fiber resulting in a fiber having cores spaced close together with expanded mode field diameters. The dose spacing between the cores of the TEMC fiber may reduce the size of the optical components used in the optical circulator, thereby increasing the desirability of the optical circulator. The expanded mode field diameters of the cores may also reduce the amount of divergent light emitted from the cores. This improves the efficiency of light coupling and, thereby, may eliminate the need to use lenses to focus light from the fiber onto the optical circulator.

Figure 1:
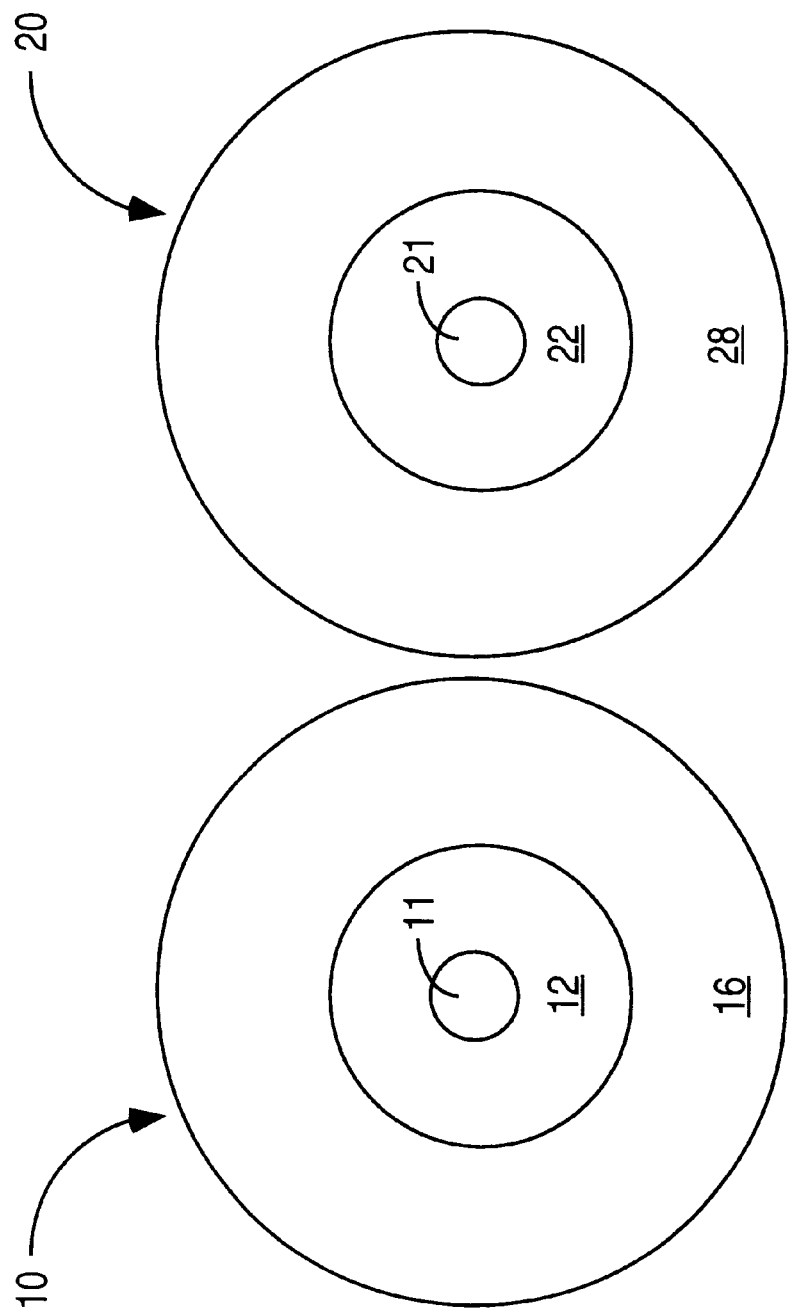
FIG. 1 illustrates a cross-section of two single core fibers.

In one embodiment, the TEMC fiber is manufactured using multiple single core fibers as illustrated in FIG. 1. It should be noted that two fibers are shown in some of the following figures only for ease of illustration and that the multiple core fiber, and its fabrication process, are not limited to only two fiber cores.

FIG. 1 illustrates a cross-section of two single core fibers. The fibers 10 and 20 have cores 11 and 21, respectively, surrounded by claddings 12 and 22, respectively. The claddings 12 and 22 are encased in outer jackets 16 and 18, respectively (not drawn to scale). In one embodiment, single mode fibers having step index core profiles are used, for example, SMF 28 manufactured by Corning of Corning, N.Y. SMF 28 fiber has a nominal mode field diameter of approximately 9 microns ($\mu$m). In another embodiment, single mode fibers having other diameters and profiles may be used. In yet another embodiment, fibers carrying more than one mode may be used.

In cores having step index profiles, light waves follow straight line trajectories until they reach the core-cladding boundary, at which the light waves bend abruptly. The propagation of the light waves through the core is based on the numerical aperture (NA) of the core, which is a function of the index of refraction of the core. The numerical aperture is independent of the position of the incident waves because cores with step index profiles have the same index of refraction throughout their radius.

In contrast, for cores with graded index profiles, the index of refraction is a function of the distance along the diameter of the core. Thus, light waves bend continuously, rather than abruptly, near the core-cladding boundary with graded index profiles. In addition, because the index profile is graded, the numerical aperture of the core is a function of the position of the entering light waves.

Figure 2:
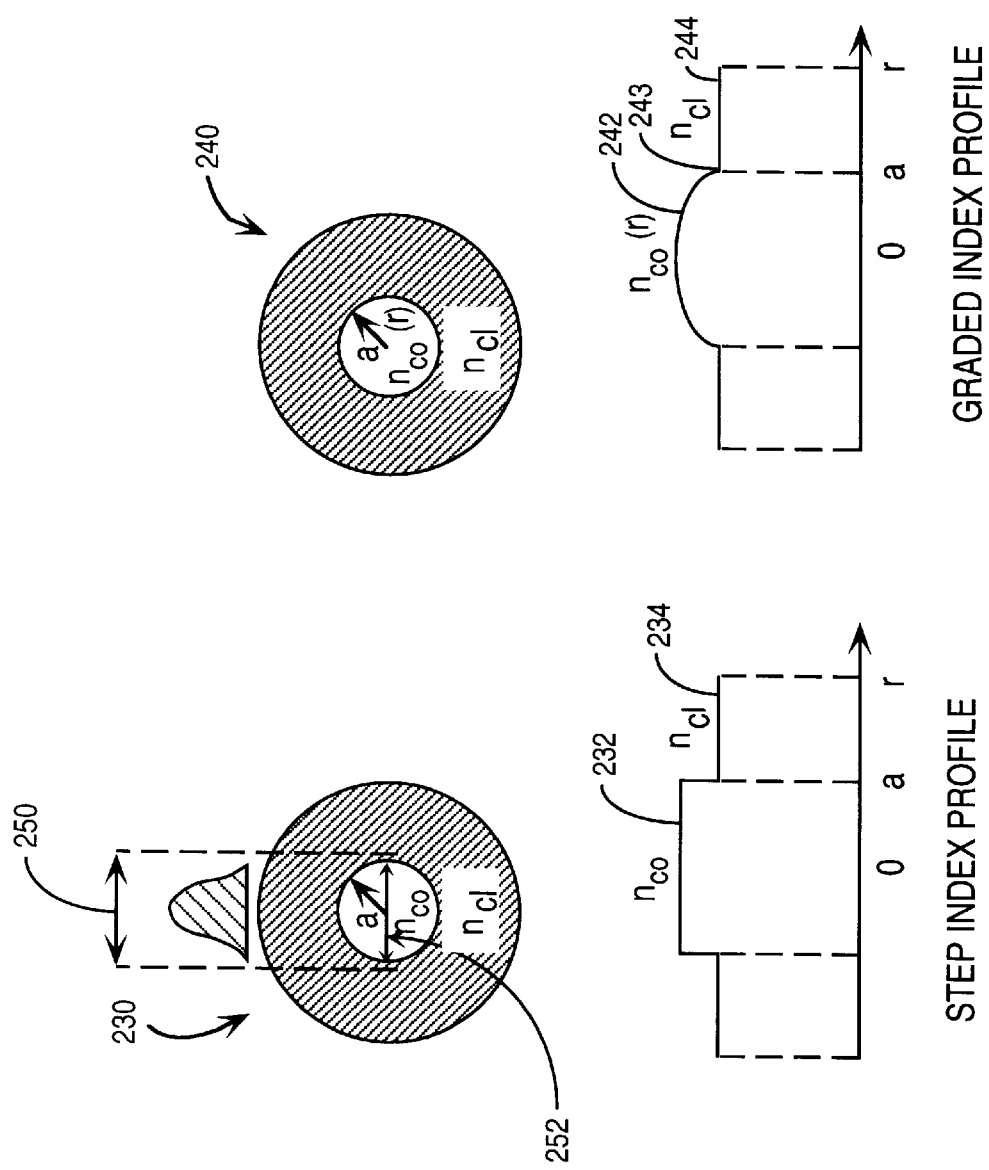
FIG. 2 illustrates the profiles of a step index fiber and a graded index fiber.

FIG. 2 illustrates the profiles of a step index fiber and a graded index fiber. The nomenclature $n_{co}$ is the index of refraction of the core and $n_{cl}$ is the index of refraction of the cladding. For a step index fiber 230 the index of refraction 232 is approximately uniform in the core region. The index of refraction steps down at the core boundary to a lower index of refraction 234 in the cladding region where it remains approximately uniform throughout the cladding. A lower index or refraction is used in the cladding in order to achieve total internal reflection of the light beam as it travels along the core.

For a graded index fiber 240, the index of refraction in the core region 242 is a function of the radial distance from the core center. The index of refraction in the core 242 is given by $n_{co}(r)$ with $r \leq a$ where a is the core radius and r is the radial distance from the core center. The index of refraction in the core 242 decreases as the radial distance from the core increases until it approximately matches the index of refraction of the cladding 244 at the boundary 243.

Light waves propagating down the core and cladding of the fiber can be characterized by different modes based on electric, magnetic, and electromagnetic fields operating on the fiber. In step index fibers with circular cross sections, as illustrated in FIG. 2, the field distributions can be identified by a combination of the different modes, known as a mode field. The mode field has a light carrying diameter that is not the same as the physical diameter of the fiber. The mode field diameter, for any given wavelength of light, is affected by the indices of refraction of the core and the cladding. The mode field diameter (MFD) is characterized by a hyperbolic function that may be approximated according to the following formula:

$$MFD = 2\omega$$

where $$\omega \approx (NA \times \pi)/\lambda$$

and where $\lambda$ equals the wavelength of light propagated through the fiber.

The mode field diameter may extend out into the cladding region and, as such, will be larger than the physical diameter of the core. In one embodiment, for example, for light waves having a wavelength of 1550 nanometers, the mode field diameter 250 may be approximately 9 $\mu$m, whereas the physical core diameter 252 may be approximately 8 $\mu$m.

Referring again to FIG. 1, the single core fibers 10 and 20 are stripped of a portion of their outer jackets 16 and 28, and the claddings 12 and 22 are aligned together along a predetermined length of the exposed claddings. In one embodiment, the claddings 12 and 22 are aligned by placing claddings 12 and 22 on a plate such that the centers of their respective cores are in substantial alignment along one line and held in place using a securing tool. The claddings 12 and 22 are then joined along the predetermined length using a fusion process.

Figure 3:
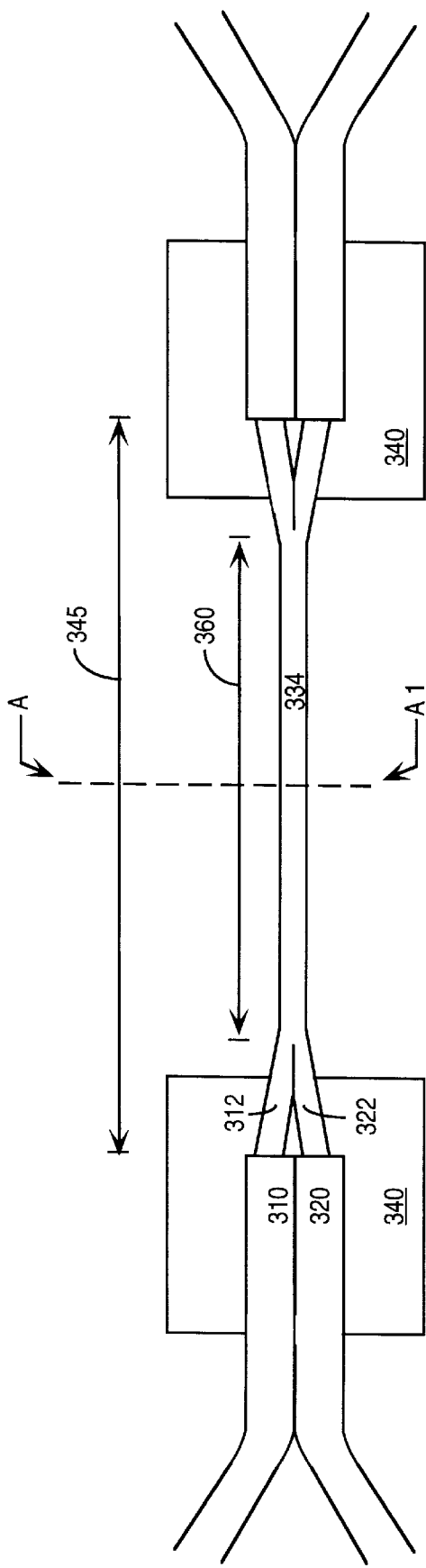
FIG. 3 illustrates one embodiment of a fusion process.

FIG. 3 illustrates one embodiment of a fusion process. The single core fibers 310 and 320 are stripped of their outer jackets, exposing claddings 312 and 322 along segment 345 of the fibers. The fibers 310 and 320 are then placed on an alignment bar 340 that aligns the claddings 312 and 322 along a length 360. In one embodiment, the claddings 312 and 322 are aligned along a length 360 of approximately 8 millimeters. In another embodiment, the claddings 312 and 322 are aligned along a different length.

In one embodiment, a heat source (not shown) located underneath claddings 312 and 322 is applied along the entire length 360. Claddings 312 and 322 are heated to a temperature above the melting point of the cladding material in order to fuse the cladding 312 and 322 of the two cores (not shown). The claddings 312 and 322 are fused together along length 360 forming a common cladding 334. In one embodiment, heat source 470 is a gas flame. In another embodiment, other heat sources may be used that are well known in the art, for examples, an induction heater or a laser.

In one embodiment, the claddings 322 and 312 are heated to a temperature of approximately 1,700 degrees C.+/−200 degrees C. In another embodiment, the claddings are heated to other temperatures based on the material used for claddings 322 and 312. As the claddings 312 and 322 are fused together, the heat source operates to gradually expand the mode field diameter of the cores (not shown) in the common cladding region along length 360. The mode field diameters of claddings 312 and 322 outside of length 360 will also be affected by the heat source. However, the mode field diameters of claddings 312 and 322 outside length 360 will expand to a lesser extent than the mode field diameters within common cladding 334 because the claddings outside length 360 are not directly exposed to the heat source and, thus, heated at a lower temperature.

Figure 4:
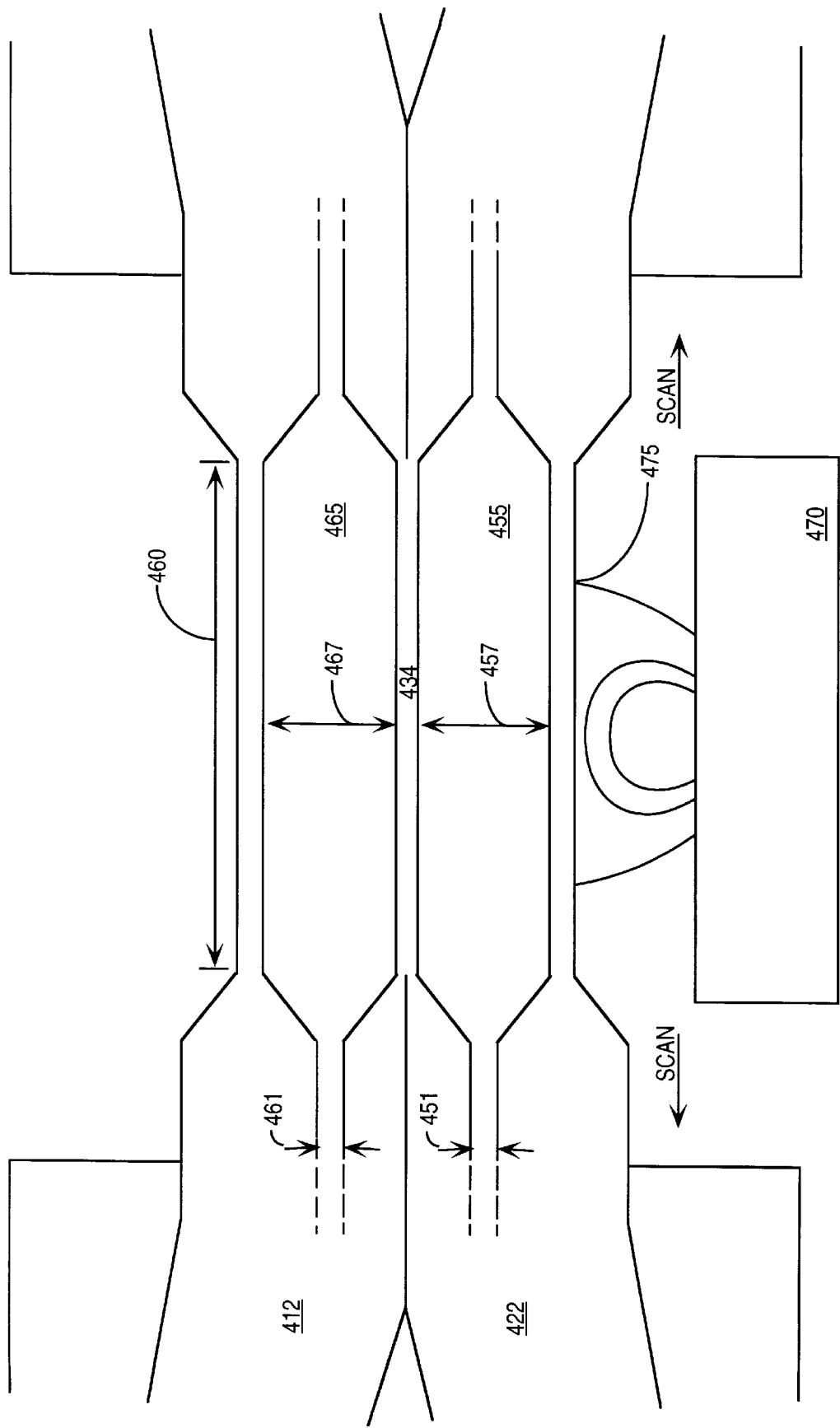
FIG. 4 illustrates another embodiment of a fusion process.

FIG. 4 illustrates another embodiment of a fusion process. A heat source 470 is applied to the exposed common cladding 434 to expand the mode field diameters of the cores inside the cladding. It should be noted that the heat source 470 is drawn on one side of the cores in FIG. 4 only for ease of illustration and that the heat source 470 is actually positioned in a manner to provide for uniform heating of the claddings.

Heat source 470 is applied to a segment of length 460 and continually scanned across length 460 to uniformly expand the mode fields of the cores. When heat source 470 comes into contact 475 along different segments of length 460, claddings 412 and 422 begin to fuse together forming common cladding 434. In addition, the mode fields 455 and 465 of the cores begin to expand from their original diameters 451 and 461, respectively, to diameters 457 and 467, respectively. As the cladding region 434 is heated, the index profiles of the cores inside cladding region 434 change from a step index to that of a graded index that tapers off at the core-cladding boundary as discussed above. In one embodiment, heat source 470 is scanned at a constant rate across length 460. In another embodiment, heat source 470 is scanned across length 460 at a varying rate in order to gradually expand mode fields from their original diameters at the end of length 460 to diameters 467 and 457 in the middle of length 460.

The mode field expansion in the fiber is based on the rate at which the heat source 470 is scanned across length 460 of the common cladding 434. A slower scan rate will result in a greater mode field expansion if the scan time remains the same. In one embodiment, heat source 470 is scanned at a rate of approximately 2 millimeters per second (mm/sec). In another embodiment, heat source 470 is scanned at a different rate to achieve a different mode field expansion. In another embodiment, the scan rate may be varied in a different manner along length 460, for examples, linearly, exponentially, and incrementally stepped. As a result, the mode fields of the cores are gradually expanded from their initial diameter to a wider diameter at the center of the length 460 of the fused cladding region.

By changing the index of refraction in the cores to a graded index profile and, thus, expanding the mode field diameters of the cores, light may be propagated through a larger area of the fiber. Changing the index of refraction in a fiber core to a graded index profile results in a narrowing of the width of a light pulsed through the fiber that may allow for an increase in information transmission rate through the fiber.

Referring still to FIG. 4, the change in the index profile alters the numerical aperture of the fiber cores (not shown) and increases their mode field diameters to diameters 457 and 467. In one embodiment, after the scanning stage, the mode field diameters of the cores are expanded by approximately a factor of two. In another embodiment, the mode field diameters are expanded by other factors. If the numerical aperture of a starting single mode core is 0.1, for example, and the mode field diameter is expanded by a factor of 2, then the numerical aperture will be approximately reduced by half. Correspondingly, if the mode field diameter is expanded from 10 $\mu$m to 30 $\mu$m, for example, then the numerical aperture will be approximately reduce by one third. A lower numerical aperture will reduce the amount of divergent light emitted from the fiber and, thus, may facilitate switching between fiber cores or coupling to other fibers.

In another embodiment, the heat source 460 is scanned for a different time and at a different temperature and rate to reflow the cladding material in order to decrease transmission loss in the fiber cores. Various factors cause transmission loss in the fiber including diameter variations, core and cladding material irregularities, and impurities. By reflowing the core and cladding material, these defects may be reduced.

Figure 5:
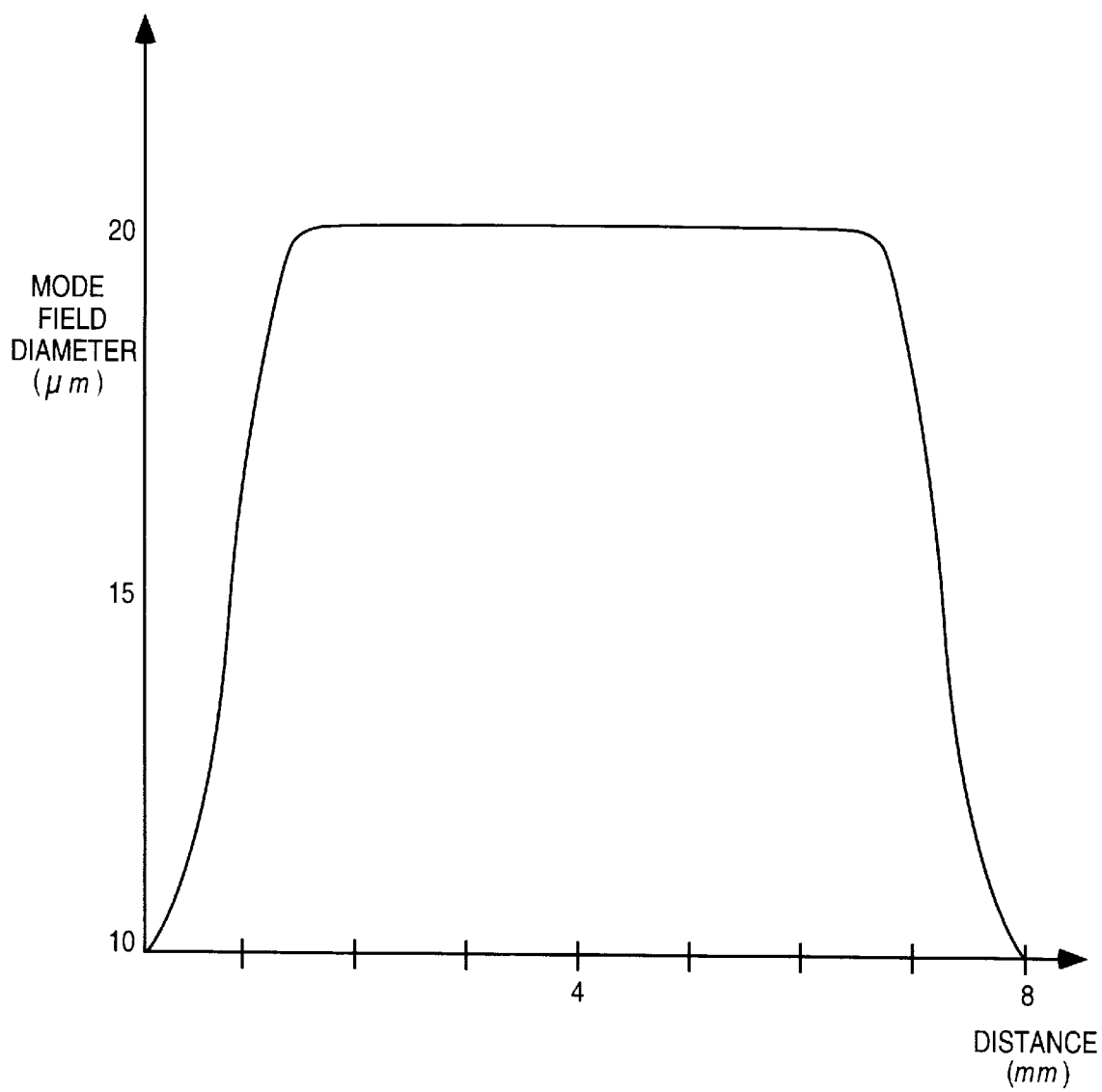
FIG. 5 illustrates a mode field expansion over a length of a fiber.

FIG. 5 illustrates an exemplary mode field expansion over a length of the fiber resulting from use of the above process. In the illustrated example, the mode fields of the fiber cores have been expanded over an 8 mm length of fused cladding material. The mode field diameter of a single core is 10 $\mu$m outside the length of the fused cladding material. The heat source is scanned across the 8 mm length, increasing the mode field diameters of the cores to a maximum of approximately 20 $\mu$m near the center region of the fused cladding. It should be noted that FIG. 5 illustrates only an example of the mode field distribution. In other embodiments, the mode field diameter may have other distributions over the length of the fused cladding.

Figure 6:
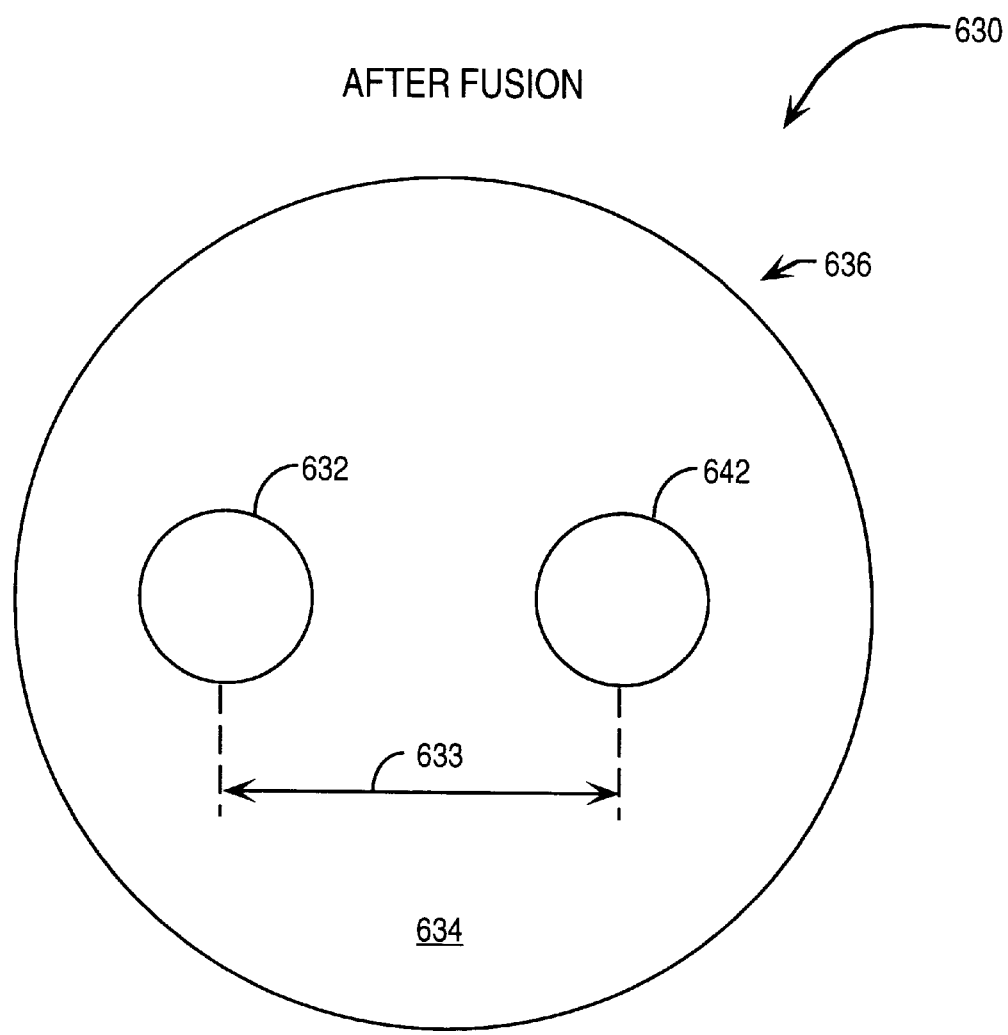
FIG. 6 illustrates a cross-section of one embodiment of a fiber after a fusion process.

FIG. 6 illustrates a cross-section of one embodiment of a fiber after a fusion process. After the fusion process, the cores 632 and 642 of fiber 630 are closer together than before the fusion process. The cores 632 and 642 are also substantially parallel with respect to each other along the length of the fused cladding. In one embodiment, for example, the cladding is fused along a length of 8 millimeters and the centers of the cores 632 and 642 have less than a 4 $\mu$m deviation of alignment over the length of the fused cladding. In one embodiment, the spacing 633 between the centers of the cores 632 and 642 after the fusion process is approximately 62.5 $\mu$m. In one embodiment, the outer surface 636 of common cladding 634 is approximately circular. In another embodiment, the outer surface 636 of common cladding 634 has other approximate shapes, for example, ovate.

The closer spacing between fiber cores may allow for more precise alignment between the cores than using, for example, two standard 125 $\mu$m (outer diameter) single core fibers having centers spaced 125 $\mu$m apart, that are inserted into a cylindrical jacket. It should be noted that although the cores have been brought closer together, the distance between the cores remains large enough so that there is no significant coupling, or cross-talk, between the cores.

Figure 7A:
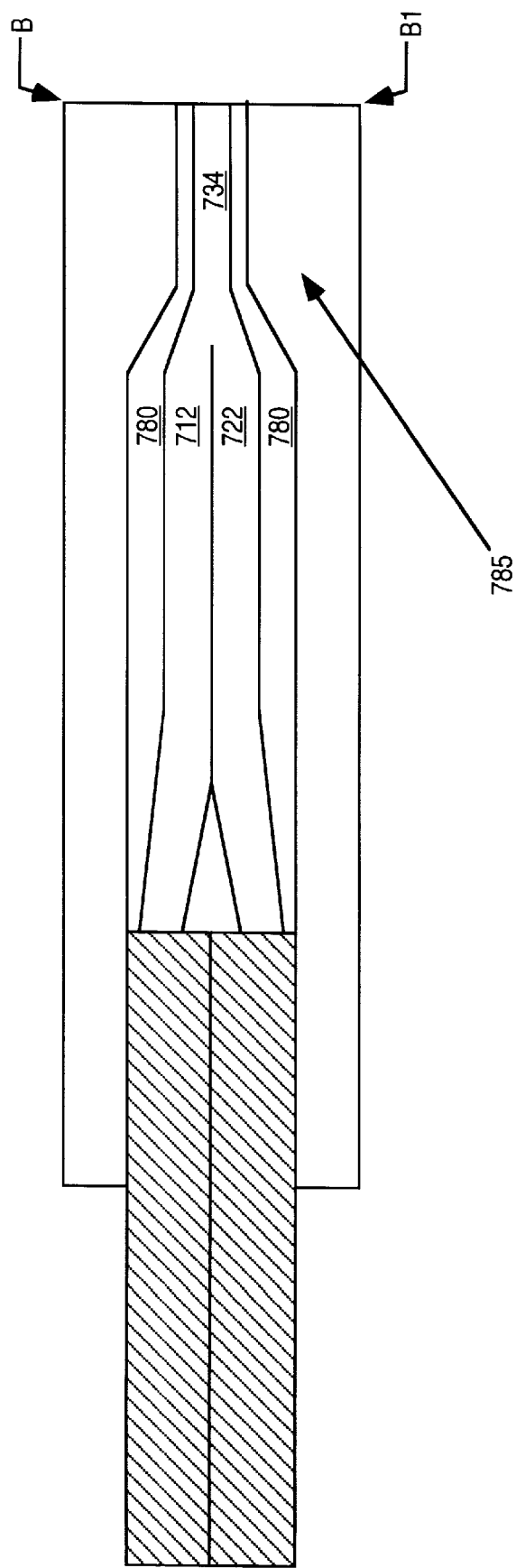
FIG. 7A illustrates one embodiment of a multiple core fiber in a capillary tube.

FIG. 7A illustrates one embodiment of a multiple core fiber in a capillary tube. After the fusion process, the fiber may be cut along a cross section AA1 of FIG. 3 of the region of common cladding and placed into a capillary tube 785 to create a fiber end having multiple non-coupled cores that are in substantial alignment along one line. An epoxy 780 is placed in between the cladding 734 and the capillary tube 780 to hold the cladding stationary within capillary tube 780. Such a fiber may be used in switching or coupling applications with more precision than when using a group of single core fibers placed next to each other. In addition, since the fiber is not processed using a stretching operation, less stressed may be introduced into the fiber than in prior fiber coupling processes. Lower stress in the fiber may result in improved signal transmission performance.

Figure 7B:
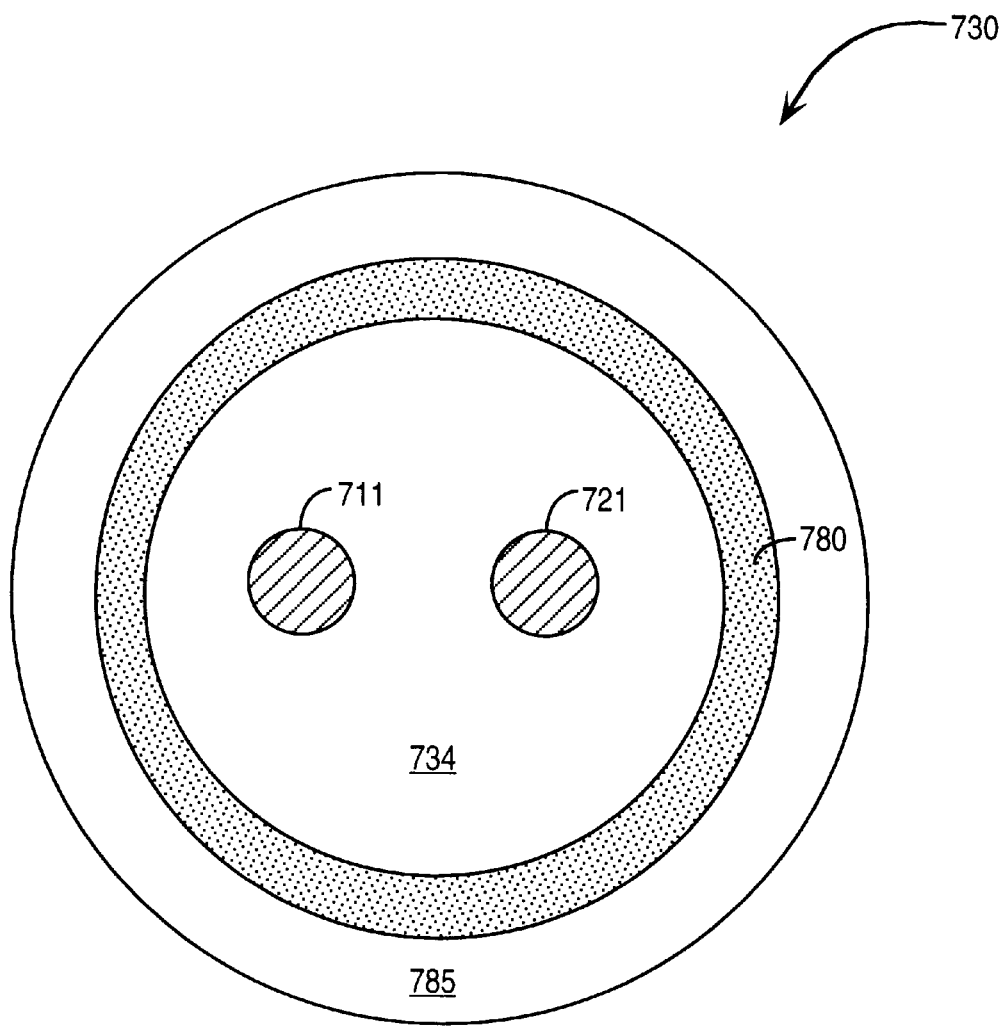
FIG. 7B illustrates a cross-section of one embodiment of a multiple core fiber in a capillary tube.

FIG. 7B illustrates a cross-section of one embodiment of a multiple core fiber in a capillary tube. The cross-section is taken along line BB1 of FIG. 7A. The cores 711 and 721 of fiber 730 are substantially parallel with respect to each other along the length (into the page) of the common cladding 734. In one embodiment, the common cladding 734 resulting after the fusion process is approximately cylindrical resulting in approximately a uniform gap between common cladding 734 and capillary tube 785. As such, epoxy 780 is generally uniformly distributed between the common cladding 734 and the capillary tube 785. The use of less epoxy and the uniform distribution of the epoxy may reduce stress induce effects resulting from the epoxy, thereby improving the reliability of the fiber.

Figure 8:
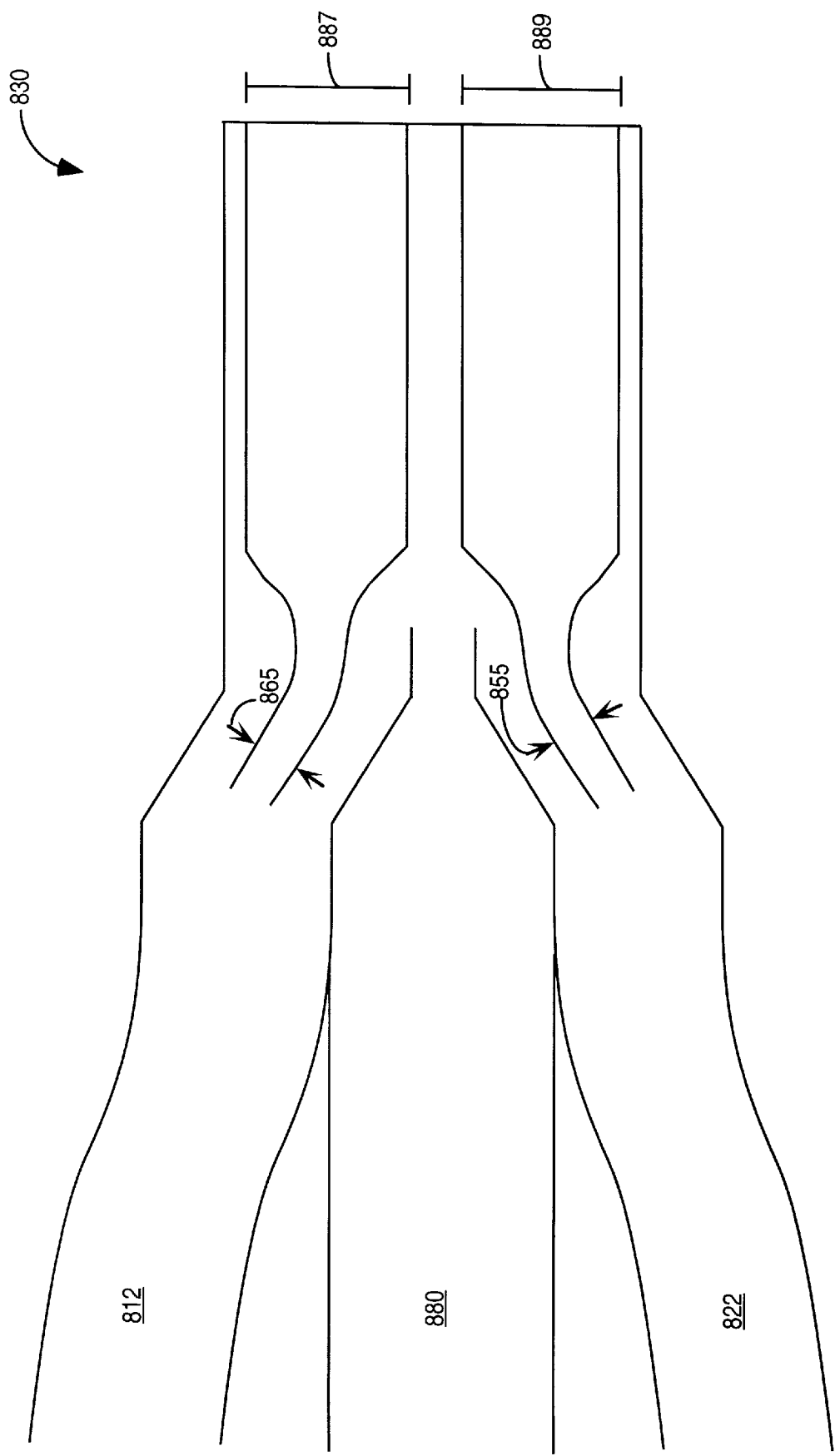
FIG. 8 illustrates a longitudinal cross-section of one embodiment of a multiple core fiber having a non-core spacer.

FIG. 8 illustrates a longitudinal cross-section of one embodiment of a multiple core fiber having a non-core spacer. Multiple core fiber 830 includes a spacer 880 in between claddings 812 and 822. As discussed above, heating the fiber cores results in an expansion of the mode field diameters of the cores. With continued heating, the mode field expansion may become so large that there may be overlap between the mode fields of the different cores within a common cladding. This may result in an undesirable coupling between the signals carried in the different cores. Spacer 880 may be used to physically separate the cores of claddings 812 and 822 so that their mode fields 887 and 889, respectively, may be further expanded. The spacer 880 (also known as a non-core fiber) is constructed from a material similar to the cladding material with the same refractive index but with no guiding properties, for example, silica. In one embodiment, spacer 880 is used to allow for greater mode field expansion while minimizing coupling between the cores.

In another embodiment, the non-core spacer 880 may be used to reduce, or even minimize, diffraction effects at the core-air interface. Diffraction effects are caused by interference at the glass-air boundary at the end of the fiber. The diffraction effects result in insertion losses that reduce the amount of power that may be transferred between fibers. By adding a non-core spacer, for example, the total outside diameter of the fiber is increased by a factor of the square root of three. In general, a wider diameter fiber results in less divergence of light waves exiting the end of the fiber.

In addition, the use of the spacer fiber allows for physical separation of the light waves exiting the cores. Light exiting from cores separated by different physical dimensions will have different incident angles on components that are coupled to the end of the fiber. For example, if a lens is coupled to the end of the fiber, the light waves from an outer core separated by two non-core spacers will be incident on the lens at a different angle than light emitted from a central core. In one embodiment, a filter is used to filter out light waves from the cores based on the incidence angle of light on the lens emitted from the cores.

It should be noted that the process described herein is not limited to only twin core fibers or fibers using a single spacer and may be used to manufacture fibers having more than two cores and utilizing more than a single spacer as illustrated in FIG. 8.

Figure 9:
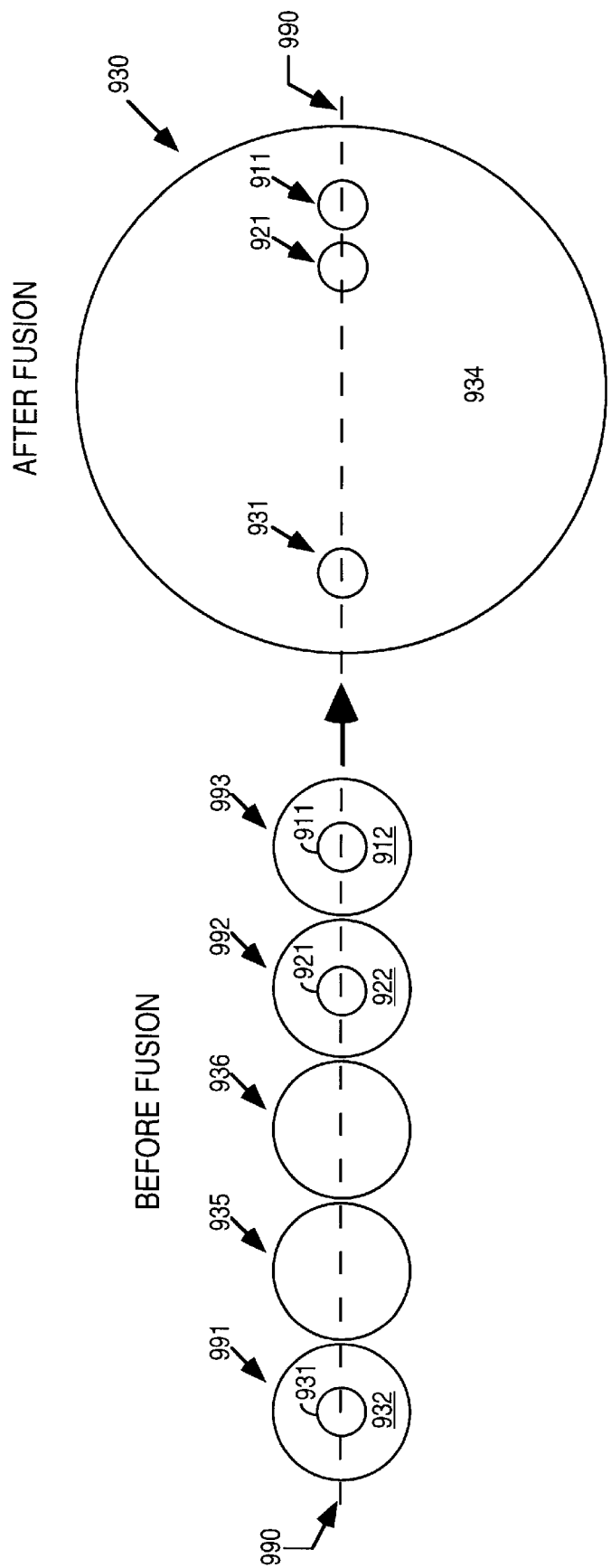
FIG. 9 illustrates a cross-section of one embodiment of a multiple core fiber having multiple non-core spacers.

FIG. 9 illustrates a cross-section of one embodiment of a multiple core fiber having multiple non-core spacers. In one embodiment, two spacers 935 and 936 are positioned between core fibers 991 and 992 that are stripped of their protective jackets. A third core fiber 993 is positioned on the side of core fiber 992 opposite that of core fiber 992. In an alternative embodiment, a different number of spacers may be used in between core fibers. In yet another embodiment, spacers may be placed on the outside of core fibers.

Multiple core fiber 930 is manufactured using a fusion process similar to that described above. After the fusion process, multiple core fiber 930 has three cores 911, 921, and 931, surrounded by a common cladding 934. During the fusion process, the spacers 935 and 936 become fused with the claddings 921, 922, and 932 that surround cores 911, 921, and 931, respectively. The common cladding 934 exists along a length of the claddings and spacers (into the page) that are aligned with each other during the fusion process. The cores 911, 921, and 931 have centers that are substantially aligned in one line 990.

Figure 10:
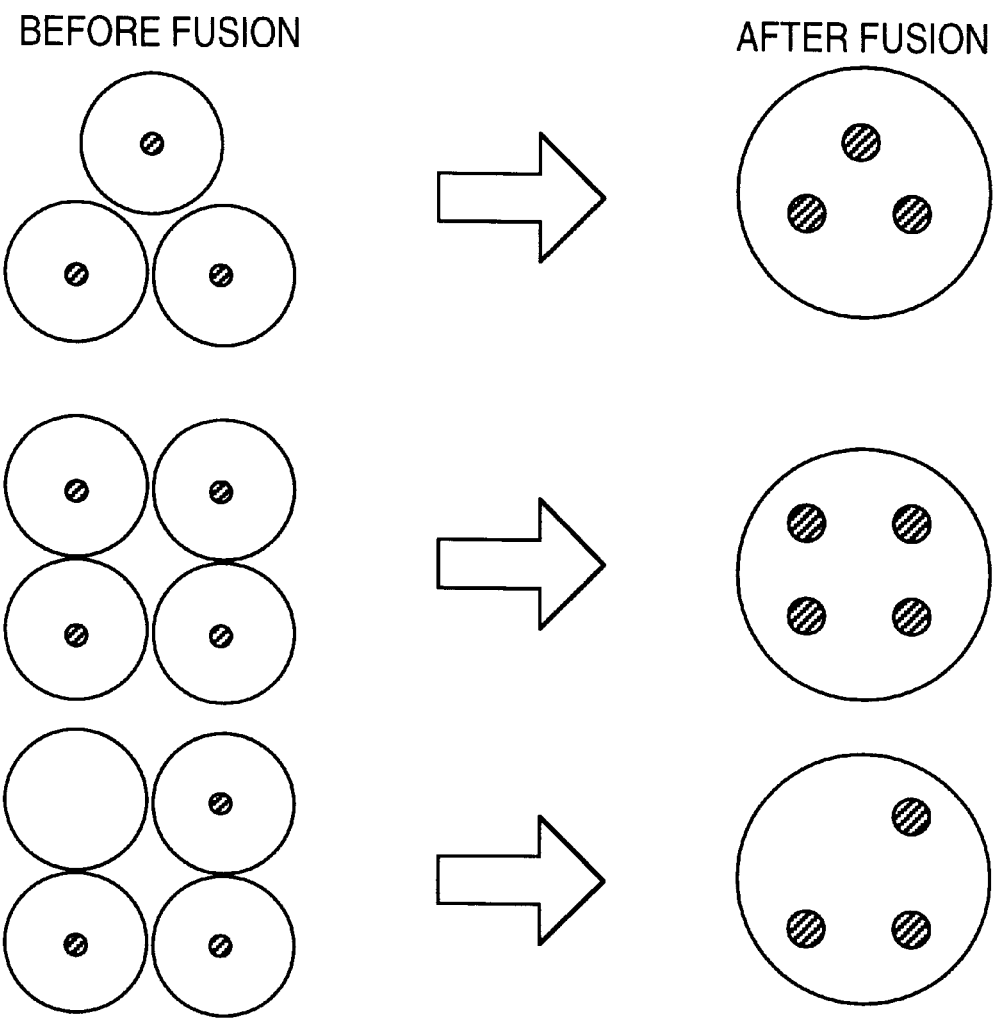
FIG. 10 illustrates cross-sections of alternative embodiments of a multiple core fiber after a fusion process.

It should noted, again, that the dimensions provided herein are only for exemplary purposes and other dimensions may be used. It should also be noted that the above described process is not limited to only fibers having multiple cores substantially aligned within one line, but may also be used to fabricate fibers having cores that aligned in other arrangements as illustrated in FIG. 10.

Figure 11:
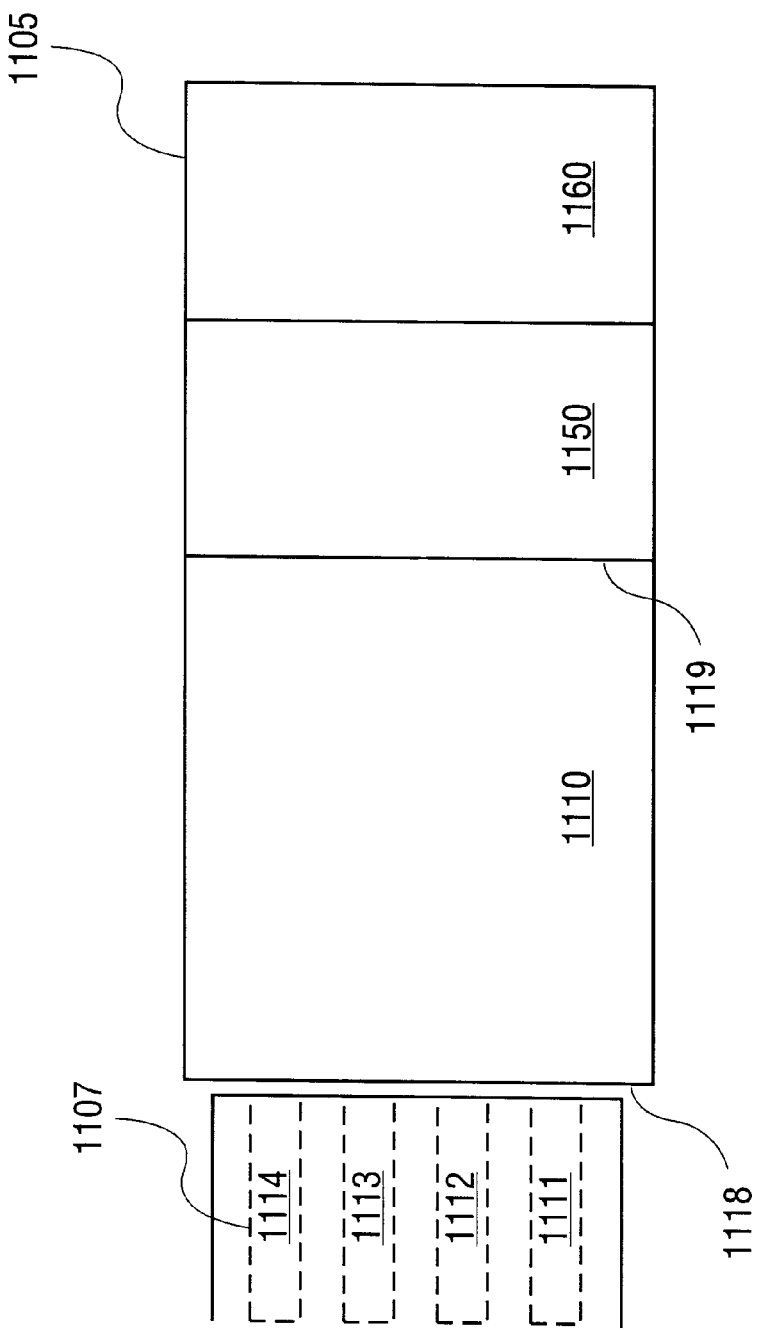
FIG. 11 illustrates one embodiment of an optical circulator with a TEMC fiber.

FIG. 11 illustrates one embodiment of an optical circulator with a TEMC fiber. For the embodiment illustrated in FIG. 11, a pair of twin core TEMC fibers 1107 having cores 1111–1114 is used with optical circulator 1105. In another embodiment, multiple TEMC fibers have different numbers of cores may be used, for examples, a single TEMC fiber having four cores and a single TEMC fiber having more or less than four cores. In yet another embodiment, optical isolator 1105 may be configured for use with a TEMC fiber having cores that are not arranged along one line as illustrated in FIG. 10.

The TEMC fiber may be fabricated using the fusion process described above. In another embodiment, a TEMC fiber that is manufactured using other methods may be used. In yet another embodiment, a TEMC fiber having non-core spacers may be used. As previously discussed in relation to FIG. 4, the divergence of light exiting the cores of a TEMC fiber may be reduced. A reduced divergence angle results in a more collimated light beam exiting the cores. As such, lenses may not be required to focus light beams from cores 1111–1114 of TEMC fiber pair 1107 onto optical circulator 1105.

In one embodiment, the TEMC fiber and the optical components may be physically coupled together using an adhesive. In another embodiment, the optical components may be physically coupled using other means, for example, a mechanical fastener.

Optical circulator 1105 includes a reciprocating core 1110, an isolator core 1150 and a reflection core 1160 (not drawn to scale). Reciprocating core 1110 operates to separate, rotate, and combine orthogonally polarized light beam components propagated through the core. Light incident at a start position on input side 1118 is propagated through reciprocating core 1110 in a forward direction to an end position on output side 1119. When light incident on output side 1119 at the end position is propagated through reciprocating core 1110 in a reverse direction, the light exits the input side 1118 at the start position.

Isolator core 1150 operates to propagate light in a forward direction along a path while inhibiting the transmission of light in the reverse direction along the same path. Reflection core 1160 operates to reflect light received from isolator core 1150 back to isolator core 1150. The reflected light is propagated back to isolator core 1150 at a different location from where it is received as discussed in further detail below.

Figure 12:
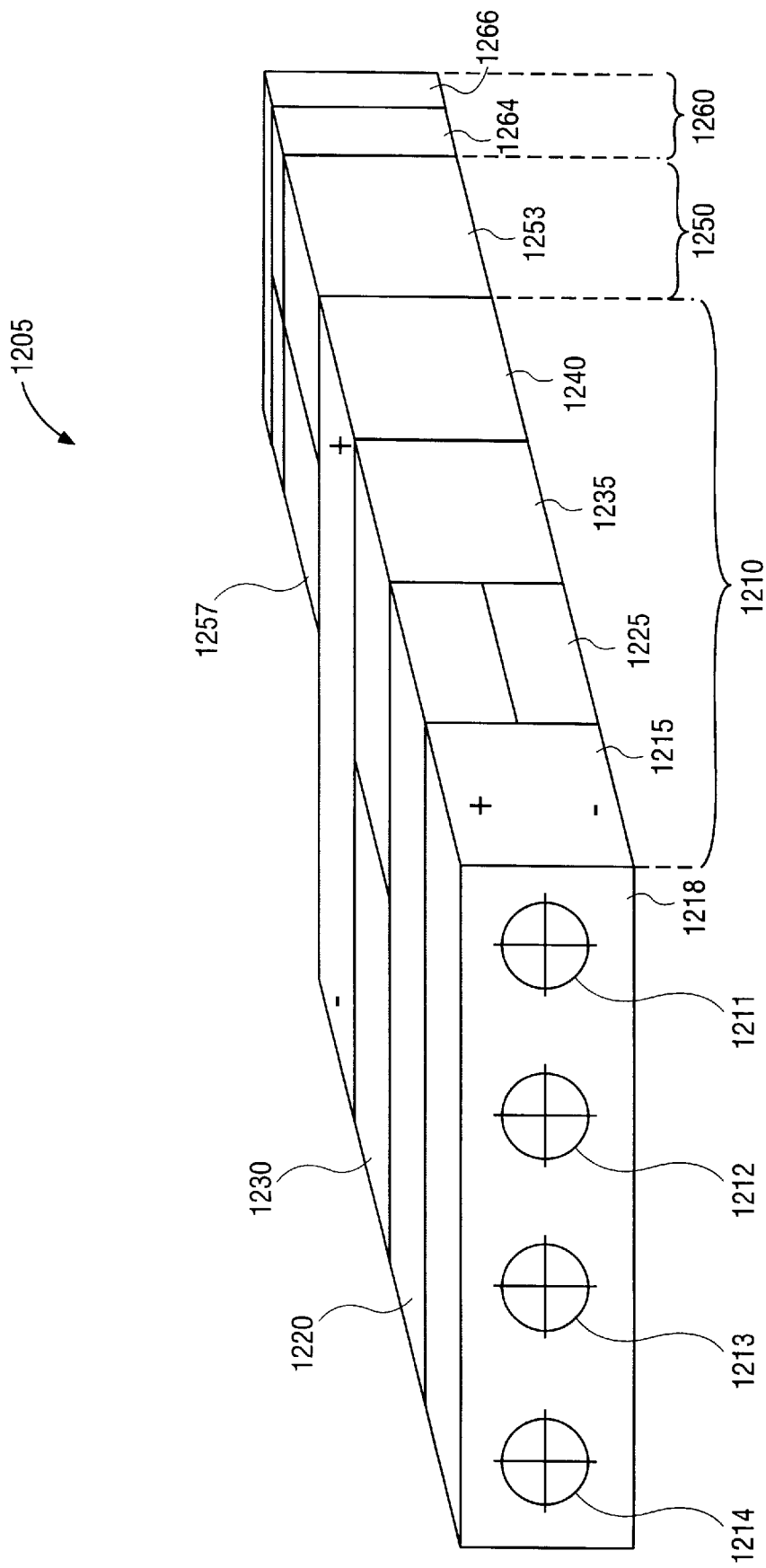
FIG. 12 illustrates one embodiment of an optical circulator.

FIG. 12 illustrates one embodiment of an optical circulator. Optical circulator 1205 includes a reciprocating core 1210, an isolator core 1250, and a reflection core 1260 (not drawn to scale). In one embodiment, light from cores 1111–1114 of TEMC fiber pair 1107 of FIG. 11 are incident on the input side 1218 of optical circulator 1205 at core positions 1211, 1212, 1213, and 1214, respectively. Optical isolator 1205 is shown receiving light from four cores only for illustration purposes. In another embodiment, the optical isolator may receive light from more or less than four cores.

Optical circulator 1205 operates to circulate the propagation of light in one direction among the cores of TEMC fiber pair 1107 of FIG. 11 and isolate any two consecutive cores in the reverse direction of circulation. For example, if light is propagated from core position 1211 to core position 1214 and from core position 1214 to core position 1213, then core position 1211 will be isolated from light propagated from core position 1214. As such, the cores 1111 and 1114 of FIG. 11 are consecutive cores.

In one embodiment, reciprocating core 1210 includes walk-off crystals 1215 and 1240, reciprocal rotators 1220 and 1235, and spacer crystals 1225 and 1230. In one embodiment, walk-off crystals 1215 and 1240 are crystals of birefringent material that split an unpolarized light beam into two orthogonally polarized light beams. When an anisotropic (birefringent) crystal is cut at a certain angle relative to its optical axis, the crystal causes a component of light in a particular polarization direction to be diverted into a different path as it passes through the crystal. The amount of divergence is proportional to the thickness of the crystal. The direction that the polarization component is diverted is referred to as the walk-off direction of the crystal.

A birefringent crystal, however, will only divert the polarization component in a polarization plane parallel to the walk-off direction and will not effect the polarization component in a plane perpendicular to the walk-off direction. In addition, a walk-off crystal is a reciprocal device such that the divergence of light passed through the crystal in a forward direction is opposite that of light passed through the crystal in a backward direction. Furthermore, two orthogonally polarized light beams may be recombined into a single light beam when passed through a walk-off crystal.

In one embodiment, walk-off crystals 1215 and 1240 are constructed from a birefringent crystal having a high index of refraction, for example, rutile ($TiO_2$). The birefringent crystal divides an entering unpolarized light beam into two components referred to as an ordinary ray and an extraordinary ray. Rutile has an index of refraction for the ordinary ray ($n_o$) of 2.451 and an index of refraction for the extraordinary ray ($n_e$) of 2.709 at 1550 nanometer (nm) wavelength light.

In another embodiment, walk-off crystals 1215 and 1240 are constructed from other birefringent materials, for examples, calcite ($CaCO_3$) and yttrium vanadate ($YVO_4$). Yttrium vanadate, for example, has an index of refraction for the ordinary ray ($n_o$) of 2.1486 and an index of refraction for the extraordinary ray ($n_e$) of 1.9447 at 1550 nm wavelength light. By using a crystal with a high index of refraction, the angular divergence of light exiting the optical circulator may be reduced. In one embodiment, walk-off crystals 1215 and 1240 are constructed from the same material. In another embodiment, walk-off crystals 1215 and 1240 may be constructed of different materials but provide the same divergence of light. The walk-off crystals discussed herein may be obtained from industry manufacturers, for example, Melles Griot, Inc. of Irvine, Calif.

Reciprocal rotators 1220 and 1235 and spacer crystals 1225 and 1230 are disposed between walk-off crystals 1215 and 1240. Reciprocal rotator 1220 is positioned adjacent spacer crystal 1225 to receive polarization components that are walked-off by walk-off crystal 1215, with spacer crystal 1225 positioned to receive polarization components that are not walked-off by walk-off crystal 1215. Reciprocal rotator 1235 is positioned adjacent spacer crystal 1230 to receive polarization components that are not walk-off by walk-off crystal 1240 in a reverse direction. Spacer crystal 1240 is positioned to receive polarization components that are walked-off by walk-off crystal 1240 in a reverse direction.

Reciprocal rotators 1220 and 1235 operate to rotate the plane of polarization of light passed through it. In one embodiment, reciprocal rotators 1220 and 1235 are half-wave plates. A half-wave plate is a reciprocal device that rotates the plane of polarization of light based on the direction which light is passed through it. The degree of rotation is determined by the acute angle between the half-wave plate principal plane and an electric field vector of linearly polarized incident light. As such, a half-wave plate rotates the polarization plane through an angle that is twice the acute angle.

Spacer crystals 1225 and 1230 are isotropic crystals having an refractive index similar to reciprocal rotators 1220 and 1235. Spacer crystals 1225 and 1230 are used to maintain the propagation of light between walk-off crystals 1215 and 1240 without rotating the polarization components of the light beams propagated between them. In one embodiment, spacer crystals 1225 and 1230 are half-wave plates with zero degrees of polarization rotation. In another embodiment, spacer crystals 1225 and 1230 are half-wave plates having opposite polarization rotations, for example, spacer crystal 1225 has a 22.5 degree polarization rotation in one direction and spacer crystal 1230 has a 22.5 degree polarization rotation in the opposite direction.

In one embodiment, isolator core 1250 includes a reciprocal rotator 1253 and a non-reciprocal rotator 1257. The isolator core 1250 is disposed between reciprocating core 1210 and reflection core 1260. The isolator core 1250 is approximately half the width of reciprocating core 1210 and is positioned between reciprocating core 1210 and reflection core 1260 to receive light beams propagated from the reciprocating core 1210. In one embodiment, reciprocal rotator 1253 is a half-wave plate and non-reciprocal rotator 1257 is a Faraday rotator. A Faraday rotator is a non-reciprocal device that rotates the plane of polarization of light in the same direction when light is passed through it in either direction. Even though Faraday rotators are set to perform a certain rotation at a certain temperature and wavelength of light, slight variations in both temperature and wavelength may introduce an error angle resulting in minor components of light beams at other polarization angles, referred to as leakage. Although these minor components may not be completely isolated, they have not been shown in the figures for ease of illustration purposes. Only the major components of the polarized light beams are discussed and illustrated in the embodiments herein. The polarization rotators discussed herein may be obtained from industry manufacturers, for example, Melles Griot, Inc. of Irvine, Calif.

Figure 13:
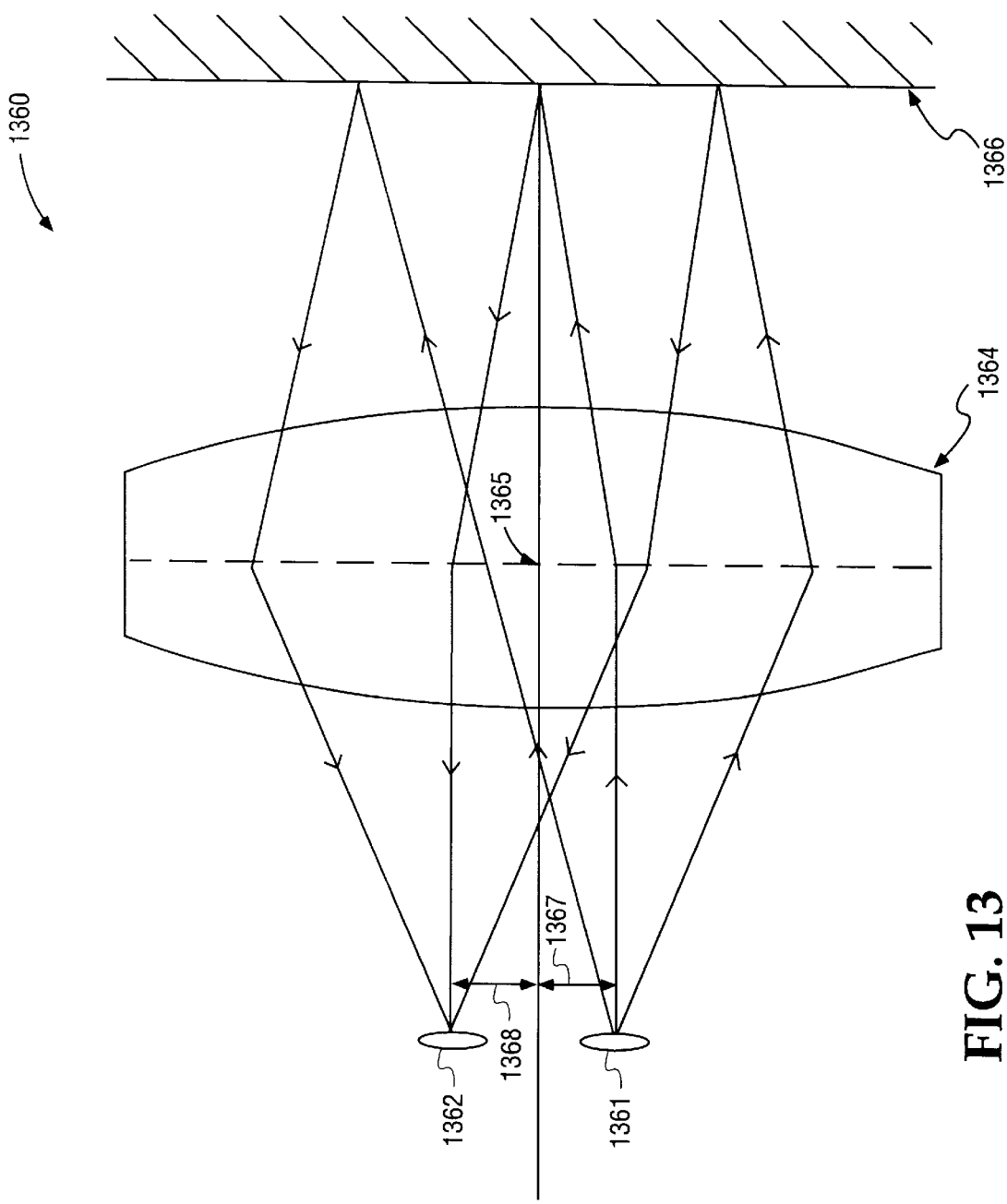
FIG. 13 illustrates the propagation of light through a lens and reflection off a mirror.

In one embodiment, reflection core 1260 includes a lens 1264 and a mirror 1266. Light received from isolator core 1250 is collimated by lens 1264 and reflected back to lens 1264 by mirror 1266. FIG. 13 illustrates the propagation of light through a lens and reflection off a mirror. Light 1362 received from isolator core 1250 of FIG. 12 is collimated by lens 1364 to mirror 1366 and then reflected back to lens 1364 by mirror 1366. The reflected light 1362 that is focused into isolator core 1250 of FIG. 12 is the mirror image of light beam 1362. As such, light beam 1362 will be displaced away from the optical axis 1365 a lateral distance (into the page of FIG. 13) that is equal to the distance (into the page of FIG. 13) of light 1361 from the optical axis 1365. Reflected light 1362 will be displaced away from the optical axis 1365 a distance 1368 that is equal to the distance 1367 of light 1361 from the optical axis 1365. In one embodiment, distances 1367 and 1368 are approximately the walk-off distance of walk-off crystal 1215 of FIG. 12, and the lateral distance is approximately a quarter of the separation distance between of the fiber cores.

A lens and a mirror are well known in the art; accordingly, a more detailed description of their internal composition and their operation is not provided herein. The lens and mirror discussed herein may be obtained from industry manufacturers, for example, Melles Griot, Inc. of Irvine, Calif.

Figure 14:
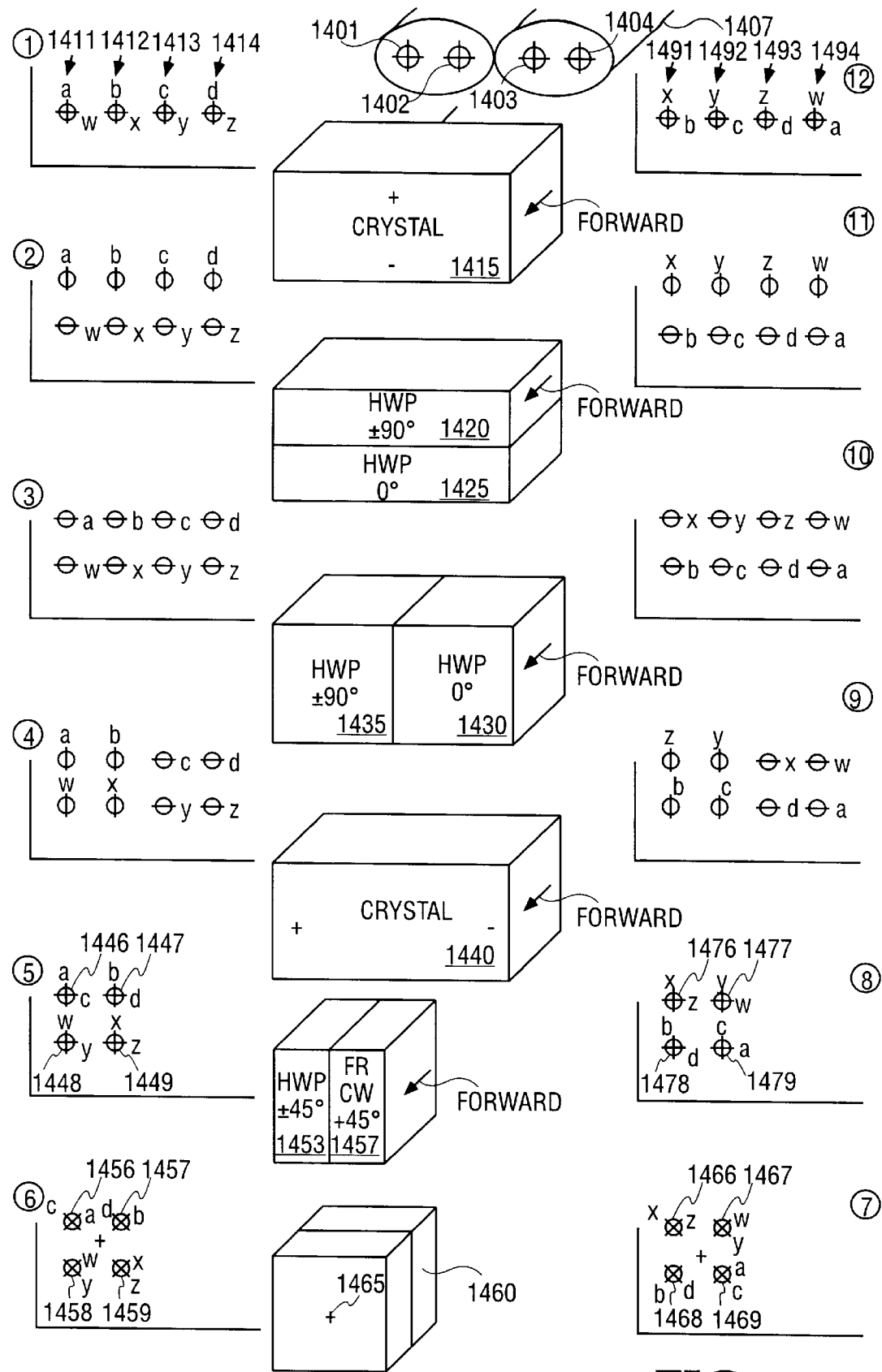
FIG. 14 illustrates the polarization of light as it propagates through one embodiment of an optical circulator.

FIG. 14 illustrates the polarization of light as it propagates through one embodiment of an optical circulator. The designations clockwise and counterclockwise refer to the polarization rotations of light beams relative to their illustration in the FIGS. 14 and 16. The cross-sections of the components of circulator 1205 of FIG. 12 are taken along planes perpendicular to the propagation path of a light beam as it travels from twin core fiber pair 1407 to mirror 1466. The optical circulator components are arranged in the same order as shown in FIG. 12. The walk-off direction for crystals 1415 and 1440 is shown by (+) and (−) symbols for one embodiment. The walk-off direction for light traveling in the forward direction (from position 1 to position 6) is from (−) to (+). For light travel in the reverse direction (from position 6 to position 12), the walk-off direction is from (+) to (−).

The positions 1 through 6 show the polarization effects of the optical circulator components on light from each core 1401–1404 of twin core fiber pair 1407 as it passes through walk-off crystal 1415, reciprocal rotators 1420 and 1425, spacer crystals 1425 and 1430, walk-off crystal 1440, and reciprocal rotator 1453 and a non-reciprocal rotator 1457, in the forward direction. In one embodiment, non-reciprocal rotator 1457 is a Faraday rotator that rotates the plane of polarization of light by approximately 45 degrees in a counterclockwise direction. In one embodiment, reciprocal rotator 1453 is a half-wave plate that rotates the plane of polarization of light by approximately 22.5 degrees when light is passed through in a forward direction and by approximately 22.5 degrees in a counterclockwise direction (negative) when light is passed through in a reverse direction. In one embodiment, reciprocal rotators 1420 and 1435 are half-wave plates that rotate the plane of polarization by approximately 90 degrees when light is passed through in a forward direction and by approximately negative 90 degrees when light is passed through in a reverse direction.

In one embodiment, the optical circulator propagates light from core 1401 to core 1404, core 1404 to core 1403, core 1403 to core 1402, and core 1402 to core 1401. Light beams 1411, 1412, 1413, and 1414 from cores 1401, 1402, 1403 and 1404, respectively are split into two orthogonally polarized light beams by walk-off crystal 1415. Light beam polarization components a, b, c, and d received from cores 1401, 1402, 1403, and 1404, respectively, are polarized in a plane that is parallel to the walk-off direction of crystal 1415. Light beam polarization components s a, b, c, and d are offset from light beam polarization components w, x, y, and z received from cores 1401, 1402 1403, and 1404, respectively, by a distance proportional to the thickness of walk-off crystal 1415. The thickness of the walk-off crystal is selected to divert the light beams a distance that will not result in overlap between diverted light beam polarization components a, b, c, and d, and light beam polarization components w, x, y, and z. At position 2, light beam polarization components a, b, c, and d are polarized parallel to the walk-off direction of walk-off crystal 1415 and light beam polarization components w, x, y, and z are polarized perpendicular to the walk-off direction of walk-off crystal 1415.

The half-wave plate 1420 rotates the planes of polarization of light beams a, b, c, and d by approximately 90 degrees in a clockwise direction with their resulting planes of polarization shown at position 3. Half-wave plate 1425 does not rotate the planes of polarization of light beam polarization components w, x, y, and z. As such, their planes at position 3 are the same as at position 2. Half-wave plate 1435 rotates the planes of polarization of light beam polarization components a, b, w, and x clockwise by approximately 90 degrees. Half-wave plate 1430 has no rotational effect on light beam polarization components c, d, y, and z, resulting in planes of polarization as shown in position 4. In an alternative embodiment, the order of half-wave plates 1420 and 1425 and half-wave plates 1435 and 1430 may be reversed.

At position 4, light beam polarization components c, d, y, and z are polarized in a plane parallel to the walk-off direction of crystal 1440. The walk-off distance of crystal 1440 is selected to divert light beam polarization components c, d, y, and x so that they overlap with a, b, w, and x, respectively. In one embodiment, the walk-off distance is approximately ($\sqrt{2}$)125 microns.

As a result, light beam polarization components c, d, y, and z are combined with a, c, w, and x, respectively, when passed through walk-off crystal 1440 resulting in light beams as show at position 5. The optical components between positions 1 and 5 have a reciprocating function as discussed above in relation to FIG. 11. As such, orthogonally polarized light beams propagating in a reverse direction from positions 5 will end up in their initial orientation and locations at position 1.

At position 5, light beam polarization components a and c form a combined orthogonally polarized light beam 1446, light beam polarization components b and d form a combined orthogonally polarized light beam 1447, light beam polarization components w and y form a combined orthogonally polarized light beam 1448, and light beam polarization components x and z form a combined orthogonally polarized light beam 1449. Light beams 1446 and 1448 are propagated through isolator component 1453 and light beams 1447 and 1449 are passed through isolator component 1457.

In one embodiment, reciprocal rotator 1453 is a half-wave plate that rotates the plane of polarization by approximately 45 degrees clockwise when light is passed through the forward direction. Non-reciprocal rotator 1457 is a Faraday rotator that rotates the plane of polarization by approximately 45 degrees clockwise when light is passed through in either direction. As such, the orthogonal components of light beams 1456, 1457, 1458, and 1459 are rotated as shown at position 6.

In one embodiment, light beams 1456, 1457, 1458, and 1459 are propagated through a reflection core 1460 having a lens and a mirror with an optical axis 1465. As discussed above in relation to FIG. 13, the reflected light beams 1466, 1467, 1468, and 1469 from reflection core 1460 are the mirror image of light beams 1456, 1457, 1458, and 1459 as shown at position 7. The reflection core 1460 is not limited to only that illustrated in FIG. 13 and may have other components and configurations to reflect incident light beams, for example, reflection core 1460 may be configured as a concave mirror.

Light beams 1466, 1467, 1468, and 1469 are then propagated through the isolator core in a reverse direction resulting in light beams 1476, 1477, 1478, and 1479 as shown at position 8. The light beams are passed through the reciprocating core components in a reverse direction resulting in light beams 1491, 1492, 1493, and 1494 shown at position 12. Light beams 1491, 1492, 1493, and 1494 are coupled to cores 1401, 1402, 1403, and 1404 respectively. As such, light beam polarization components a and w from core 1401 are propagated to core 1401. Light beam polarization components d and z from core 1404 are propagated to core 1403.

Light beam polarization components c and y from core 1403 are propagated to core 1402. Light beam polarization components b and x from core 1402 are propagated to core 1401. In this manner, light is circulated among the cores of twin core fiber pair 1407. Because a thermally expanded multiple core fiber is used, the size of the optical components in the circulator may be reduced.

In addition, walk-off crystal 1415 functions to reduce polarization mode dispersion effects. When light is split into two different polarization components by walk-off crystal 1415, the two polarization components travel at different velocities. This difference in velocity results in what is known as polarization mode dispersion (PMD). By causing the non-divergent polarization components w, x, y, and z to diverge when passing through the walk-off crystal 1415 in a reverse direction, the velocities of the two polarization components are equalized, thereby reducing PMD.

Figure 15:
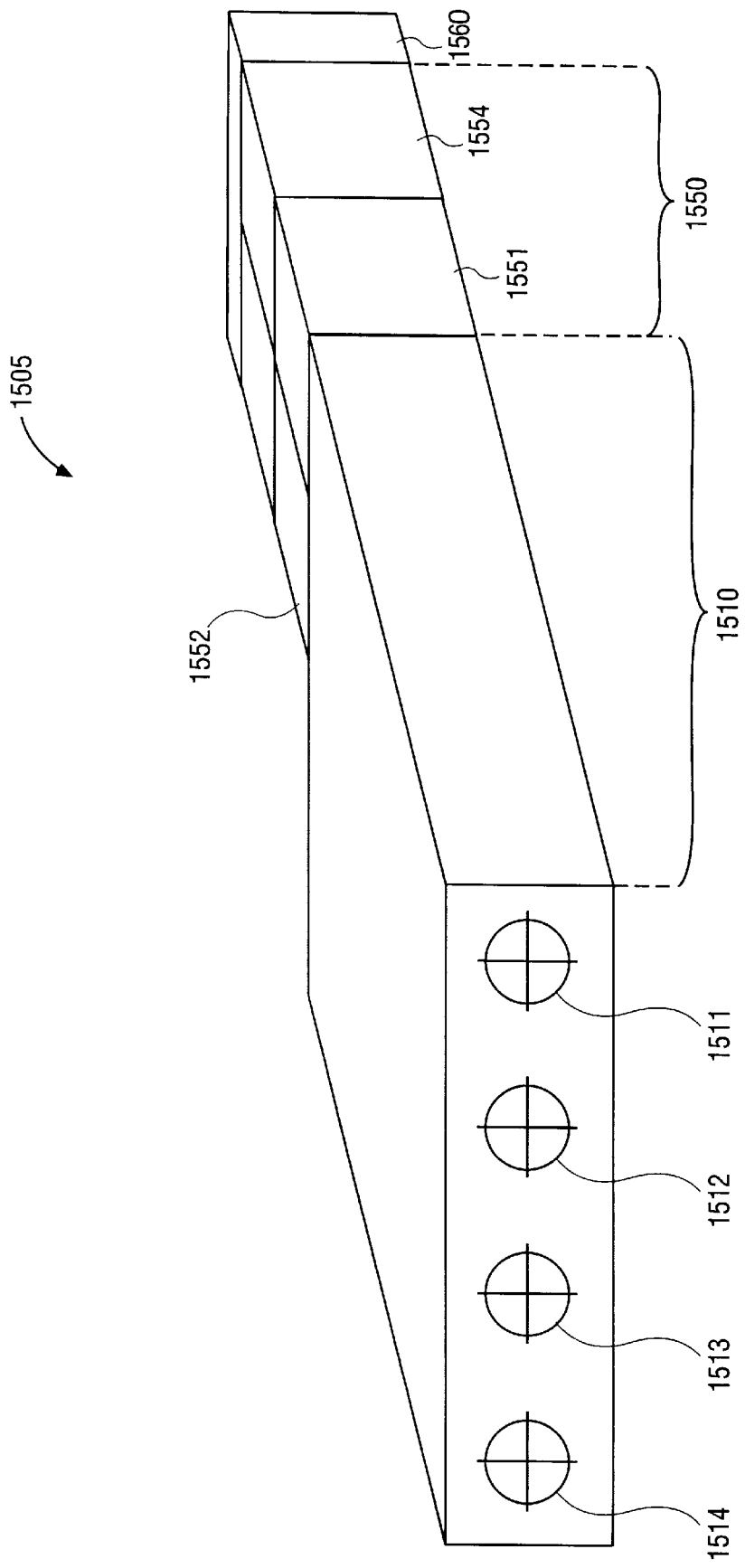
FIG. 15 illustrates an alternative embodiment of an optical circulator.

FIG. 15 illustrates an alternative embodiment of an optical circulator. Optical circulator 1505 includes a reciprocating core 1510, an isolator core 1550, and a reflection core 1560 (not drawn to scale). In one embodiment, isolator core 1550 includes reciprocal rotators 1551 and 1552 and non-reciprocal rotator 1554.

In one embodiment, reciprocating core 1510 and reflection core 1560 are the same as reciprocating core 1210 and reflection core 1260, respectively, and isolator core 1550 operates similar to isolator core 1240 of FIG. 14. As such, light from core positions 1511–1514 is circulated among the core positions similar to that illustrated with respect to FIG. 14, with the propagation of light through isolator core 1550 illustrated, for one embodiment, in FIG. 16.

Figure 16:
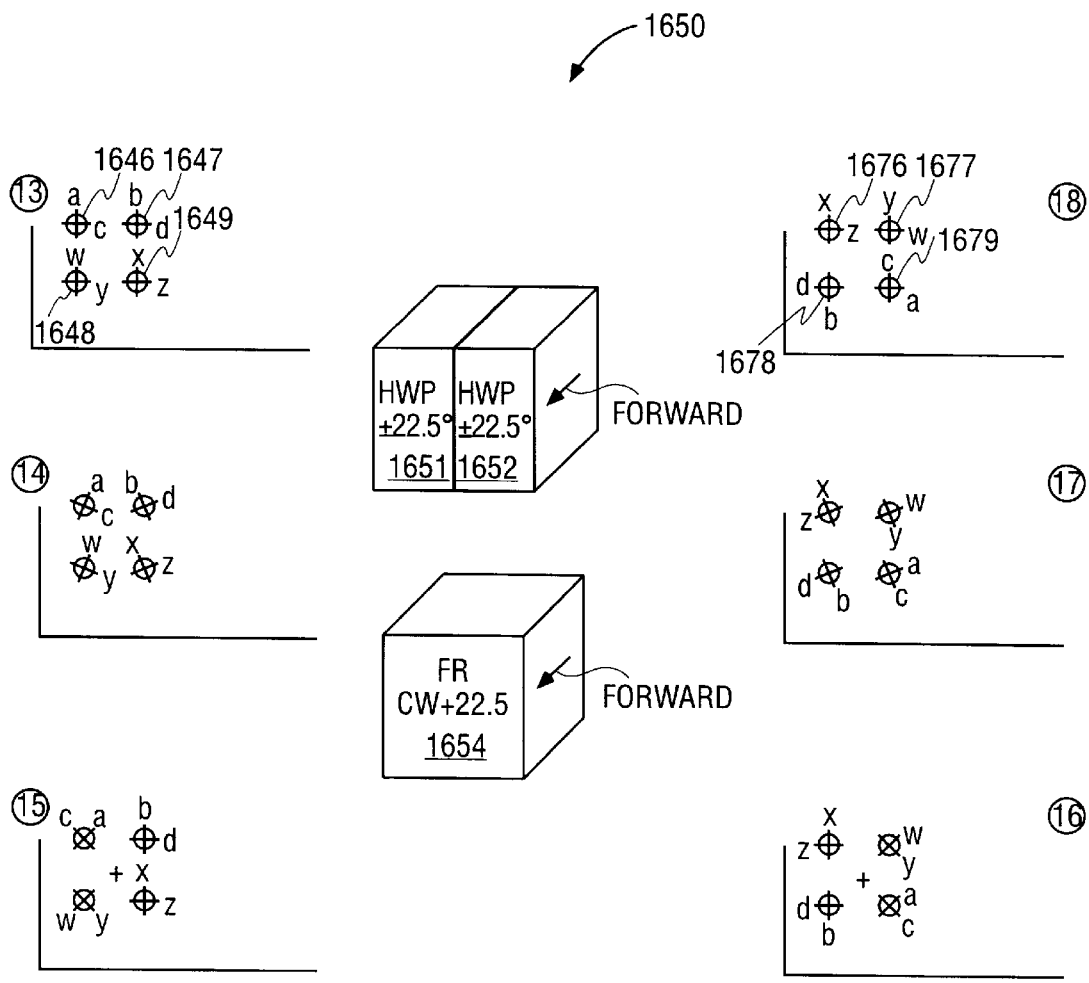
FIG. 16 illustrates the polarization of light as it propagates through an alternative embodiment of an isolator core.

FIG. 16 illustrates the polarization of light as it propagates through an alternative embodiment of an isolator core. Isolator core 1650 includes reciprocal rotators 1651 and 1652, and non-reciprocal rotator 1654. In one embodiment, reciprocal rotator 1651 is a half-wave plate that rotates a plane of polarization by approximately 22.5 degrees counterclockwise when light is passed through in a forward direction. In one embodiment, reciprocal rotator 1652 is a half-wave plate that rotates a plane of polarization by approximately negative 22.5 degrees (counterclockwise) when light is passed through in a forward direction. In one embodiment, non-reciprocal rotator 1654 is a Faraday rotator that rotates a plane of polarization by approximately 22.5 degrees in a clockwise direction.

Light beams 1646, 1647, 1648, and 1649 are light beams received from the reciprocating core 1510 of FIG. 15. In one embodiment, light beams 1646, 1647, 1648, and 1649 have polarization components similar to light beams 1446, 1447, 1448, and 1449 of FIG. 14. As such, light beams 1646, 1647, 1648, and 1649 may be received from cores 1401, 1402, 1403, and 1404, respectively, of FIG. 14. The polarization components of light beams 1646, 1647, 1648, and 1649 are rotated as they are propagated through half-wave plates 1651 and 1652, and Faraday rotator 1654 in a forward direction to reflection core 1560 of FIG. 15. Reflected light beams from reflection core 1560 are propagated back through Faraday rotator 1654 and half-wave plates 1651 and 1652 in a reverse direction with their polarization components rotated as shown by light beams 1676, 1677, 1678, and 1679. The polarization components x and z, y and w, d and b, c and a, of light beams 1676, 1677, 1678, and 1679, respectively, are similar to the polarization components of light beams 1416, 1417, 1418, and 1419, respectively, of FIG. 14. As such, the light beam's polarization components will propagate through reciprocating core 1510 and couple light between fiber cores as shown in FIG. 14.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus for coupling light among a plurality of cores, comprising:

a thermally expanded multiple core fiber having a plurality of cores; and a circulator coupled to the thermally expanded multiple core fiber, the circulator to propagate light in one direction among consecutive cores of the plurality of cores, the circulator to isolate light between consecutive cores.

2. The apparatus of claim 1, wherein the circulator comprises a plurality of optical components to separate, rotate, and combine orthogonally polarized components of light.

3. The apparatus of claim 2, wherein the plurality of cores comprises a last and a first core, the last core and the first core being consecutive cores.

4. The apparatus of claim 3, wherein the plurality of optical components comprise:

a reciprocating core;

an isolator core coupled to the reciprocating core; and a reflection core coupled to the isolator core.

5. The apparatus of claim 4, wherein the reciprocating core comprises:

a plurality of half-wave plates; and a plurality of walk-off crystals.

6. A method for circulating light, comprising:

receiving a plurality of light beams from a thermally expanded multiple core fiber having a plurality of cores; and coupling the plurality of light beams between the plurality of cores and an optical circulator without the use of a lens disposed between the optical circulator and the plurality of cores.

7. The method of claim 6, further comprising:

propagating the plurality of light beams through the optical circulator in a direction to selectively couple the plurality of light beams among the plurality of cores; and inhibiting the propagation of the plurality of light beams between any two consecutive cores of the plurality of cores.

8. The method of claim 7, wherein propagating the plurality of light beams comprises:

separating each of the plurality of light beams into orthogonally polarized components;

rotating the orthogonally polarized components; and combining the orthogonally polarized components of different light beams of the plurality of light beams.

9. An optical circulator, comprising:

a reflection core;

an isolating core coupled to the reflection core; and a reciprocating core coupled to the isolating core, the reciprocating core comprising:

a first walk-off crystal having a first walk-off direction;

a second walk-off crystal having a second walk-off direction perpendicular to the first walk-off direction;

a plurality of reciprocal rotators disposed between the first and the second walk-off crystals; and a plurality of spacer crystals disposed between the first and the second walk-off crystals.

10. The optical circulator of claim 9, wherein the plurality of reciprocal rotators comprises:

a first reciprocal rotator to rotate a polarization plane by approximately 90 degrees; and a second half-wave plate coupled to the first half-wave plate, the second have-wave plate to rotate the polarization plane by approximately 90 degrees.

11. The optical circulator of claim 10, wherein the plurality of spacer crystals are half-wave plates to rotate the polarization plane by approximately zero degrees.

12. The optical isolator of claim 11, wherein the isolating core comprises:

a third half-wave plate to rotate the polarization plane by approximately 45 degrees; and a Faraday rotator adjacent to the third half-wave plate, the Faraday rotator to rotate the polarization plane by approximately 45 degrees.

13. The optical circulator of claim 12, wherein the reciprocating core is configured to receive light from a thermally expanded multiple core fiber.

14. The optical isolator of claim 11, wherein the isolating core comprises:

a third and a fourth half-wave plates adjacent to each other, the third and the fourth half-wave plates to rotate the polarization plane by approximately 22.5 degrees; and a Faraday rotator coupled to the third and the fourth half-wave plates, the Faraday rotator to rotate the polarization plane by approximately 22.5 degrees.

15. The optical circulator of claim 14, wherein the reciprocating core is configured to receive light from a thermally expanded multiple core fiber.

* * * * *